United States Patent [19]
Doane, Jr.

[11] Patent Number: 4,781,647

[45] Date of Patent: Nov. 1, 1988

[54] TOY DOLL CONSTRUCTION WITH PHOSPHORESCENT HAIR FIBERS

[75] Inventor: Linwood E. Doane, Jr., Cumberland, R.I.

[73] Assignee: Hasbro, Inc., Pawtucket, R.I.

[21] Appl. No.: 46,180

[22] Filed: May 4, 1987

[51] Int. Cl.$^4$ .................. A63H 33/22; A63H 3/36; A41G 3/00; B32B 9/00
[52] U.S. Cl. ..................................... 446/219; 446/394; 446/385; 132/53; 252/301.33; 428/690; 428/913
[58] Field of Search ............... 446/219, 394, 391, 319, 446/385, 296; 132/53; 252/646, 301.33, 301.34; 428/690, 913, 691, 917

[56] References Cited

U.S. PATENT DOCUMENTS

| | | | |
|---|---|---|---|
| 1,791,199 | 2/1931 | Gardner | 252/646 |
| 2,110,161 | 3/1938 | Leverenz | 252/646 |
| 2,382,355 | 8/1945 | Warren, Jr. | 28/81 |
| 3,291,668 | 12/1966 | Goldstein | 428/690 X |
| 3,382,607 | 5/1968 | Ryan et al. | 446/394 X |
| 3,758,771 | 9/1973 | Frohardt et al. | 132/53 X |
| 4,595,599 | 6/1986 | Brown et al. | 252/646 X |
| 4,623,579 | 11/1986 | Quon | 428/690 X |

FOREIGN PATENT DOCUMENTS 609197 9/1948 United Kingdom ......... 252/303.3 R

OTHER PUBLICATIONS

"Plastics that Glow in the Dark," Modern Plastics; 10, 48, pp. 88-91.

Primary Examiner—Robert A. Hafer
Assistant Examiner—D. Neal Muir
Attorney, Agent, or Firm—Salter & Michaelson

[57] ABSTRACT

A synthetic phosphorescent fiber having a sectional dimension of less than approximately 0.015 in. and a method of manufacturing the fiber. The fiber comprises a body portion made of a flexible and durable polymeric material which is at least partially translucent and a plurality of phosphorescent particles in the body portion. The particles have a maximum particle size which is less than one half of the sectional dimension of the fibers and between approximately 0.0075 in. and 0.0005 in. and they have a mean particle size which is greater than approximately 0.0025 in. The fibers are manufactured in accordance with the method by mixing appropriately sized phosphorescent particles with a coupling agent, mixing the particles and the coupling agent with a suitable polymer and extruding the resultant mixture to form fibers. The fibers can be effectively utilized for artificial hair for toy dolls as well as for various other applications.

8 Claims, 1 Drawing Sheet

TOY DOLL CONSTRUCTION WITH PHOSPHORESCENT HAIR FIBERS

BACKGROUND AND SUMMARY OF THE INVENTION

The instant invention relates generally to phosphorescent or photoluminescent materials, and more particularly to a thin phosphorescent fiber and a method of forming same and to a combination of the fiber in a toy doll.

It has long been recognized that the appeal of certain toys can be enhanced by imparting phosphorescent properties to various elements thereof. However, heretofore, it has only been possible to impart phosphorescent properties to certain elements of toys which can be coated with phosphorescent coatings or which can be made from materials having phosphorescent particles therein. In this regard, heretofore it has specifically not been possible to include phosphorescent elements having thin fibrous constructions in toys or other items, since heretofore suitable thin phosphorescent fibers have simply not been available. Further, while the concept of utilizing phosphorescent fibers for artificial hair fibers in toy dolls has not been heretofore known, phosphorescent fibers which are suitable for use as artificial hair fibers have not been heretofore available, and methods of manufacturing such fibers have not been heretofore known or available. In this regard, while certain types of phosphorescent fibers having relatively large diameters, i.e., cross sectional dimensions of greater than approximately 0.015 in., have been heretofore available, phosphorescent fibers having cross sectional dimensions which are sufficiently small to enable them to be effectively utilized for applications such as for artificial hair fibers for toy dolls or for textile applications have simply not been heretofore available. Further, none of the heretofore known methods for manufacturing phosphorescent elements have been suitable for manufacturing phosphorescent fibers having cross sectional dimensions which are sufficiently small to enable the fibers to be utilized for artificial hair fibers or for manufacturing textiles.

It has recently been recognized that the play value of certain toy dolls can be significantly increased by imparting phosphorescent properties to the hair thereof. Specifically, it has been recognized that by imparting phosphorescent properties to the hair of certain toy dolls, the dolls can be effectively incorporated into imaginary concepts and themes wherein they are capable of having imaginary dreams. More specifically, it has been found that by imparting glow-in-the-dark properties to the hair of certain toy dolls, the dolls can be effectively incoporated into a theme wherein they live in an imaginary dream world where toy dolls are capable of having nighttime dreams.

As a result of the recently recognized benefits of providing relatively thin synthetic fibers having phosphorescent properties for use in toy doll constructions as well as in other applications, a need has developed for a type of relatively thin, durable phosphorescent or photoluminescent fiber which can be effectively utilized for imitation hair strands as well as for other applications, such as for textile fibers. In this regard, it has been found that conventional doll hair fibers must generally have substantially uniform cross sectional dimensions which are in the range of between approximately 0.002 in. and 0.004 in. and generally they are made of relatively flexible and durable polymeric materials. Further, it has generally been found that conventional fibers of this type must possess sufficient strengths to enable them to be mechanically rooted in the heads of toy dolls and also to enable them to withstand substantial abuse. Unfortunately, however, it has been found that phosphorescent properties generally cannot be effectively imparted to relatively thin fibers of this type by conventional methods. Specifically, it has been found that it is simply not practical to apply phosphorescent coatings to relatively thin fibers since it is generally not practical to dip individual fibers into coating materials and also since such coatings generally produce undesirable rough surface characteristics in fibers which make them unsuitable for use as imitation hair fibers. It has also been found that it is not possible to impart phosphorescent properties to conventional hair strands by adding conventional phosphorescent particles to the material from which fibers are made since the heretofore available phosphorescent particles have been so large that they have been found to weaken synthetic fibers to the extent that they are rendered unsuitable for most applications including applications wherein they are used as imitation hair fibers.

The instant invention provides an effective solution to the problem of providing phosphorescent fibers which can be utilized for a variety of applications including use as imitation hair fibers for toy dolls. Specifically, the instant invention provides a novel phosphorescent fiber construction and an effective method for manufacturing phosphorescent fibers. The phosphorescent fiber of the instant invention is preferably made in an extrusion process, and it comprises a body portion made from a polymeric material which is at least partially translucent and a plurality of phosphorescent particles in the body portion. The body portion has a cross sectional dimension of less than approximately 0.015 in. and preferably in the range of between 0.002 in. and 0.004 in. and it is preferably made of a material selected from the group consisting of polyamides, polyesters, polyolefins, polyacrylonitriles and polyvinyl chlorides. The phosphorescent particles have a maximum particle size which is between 0.0075 in. and 0.0005 in. and which is also less than one half of the cross sectional dimension of the body portion. The mean particle size of the phosphorescent particles is preferably greater than approximately 0.00025 in., and the particles are preferably made of a material selected from the group consisting zinc sulfide, cadmium sulfide and calcium sulfide. The fiber preferably further comprises a coupling agent, such as a silane or a titanate coupling agent, which is suitable for coating the phosphorescent particles to enable them to be effectively mixed with the polymeric material of the body portion during the manufacturing of the fibers.

The method of the instant invention comprises the steps of mixing a plurality of phosphorescent particles with an unhardened polymeric material and extruding the resultant mixture to form fibers having sectional dimensions which are less than approximately 0.015 in. but greater than twice the maximum sizes of the phosphorescent particles. In accordance with the method, the phosphorescent particles are preferably first premixed with a coupling agent, such as a silane or a titanate coating agent, which is suitable for coating the phosphorescent particles. In this regard, it has been found that the use of a coupling agent of this type effectively enhances the distribution of the phosphorescent particles in finished fibers so that the fibers have substantially uniformly phosphorescent properties and so that they are not significantly weakened by areas of high concentrations of the phosphorescent particles therein.

The closest prior art to the subject invention of which the applicant is aware is disclosed in the U.S. Pat. Nos. to GARDNER, 1,791,199; LEHMAN, 2,290,690; ROBINS et al, 2,376,813; WARREN, JR., 2,382,355; FARRIS, 2,410,277; DORT, 2,456,808; WADELY, 2,787,558; NADEL, 2,939,271; YACKO, 3,578,354; HAWTIN et al, 3,614,843; GRAVISSE, 4,208,300; and GRAVISSE et al, 4,211,813. Of these references, the U.S. Pat. No. to GARNDER, 1,791,199 is believed to be the most pertinent, but even this reference fails to suggest the specific details of the method of the subject invention which enable it to be utilized for manufacturing fibers having sectional dimensions of less than approximately 0.015 in., and it also fails to suggest a fiber construction having the specific features of the fiber of the subject invention. Accordingly, even The U.S. patent to GARDNER is believed to be of only general interest.

As a result of the above, it is a primary object of the instant invention to provide a method of manufacturing a phosphorescent fiber which is suitable for use as imitation hair in a toy doll construction.

Another object of the instant invention is to provide a method of manufacturing relatively thin phosphorescent fibers.

Another object of the instant invention is to provide an effective relatively thin, phosphorescent fiber construction which is suitable for use as imitation hair for a toy doll.

An even further object of the instant invention is to provide a toy doll construction having phosphorescent hair.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
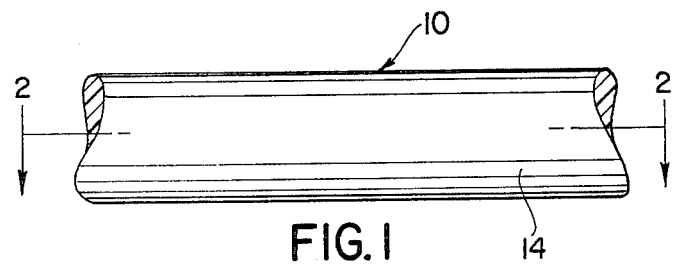
FIG. 1 is an enlarged side elevational view of a phosphorescent fiber of the instant invention.
Figure 2:
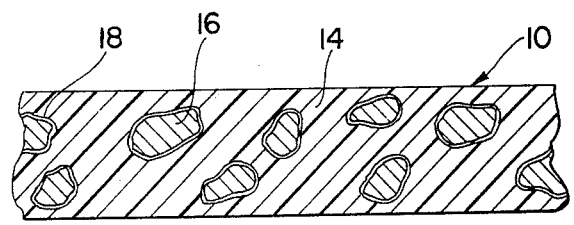
FIG. 2 is a sectional view taken along line 2—2 in FIG. 1.
Figure 3:
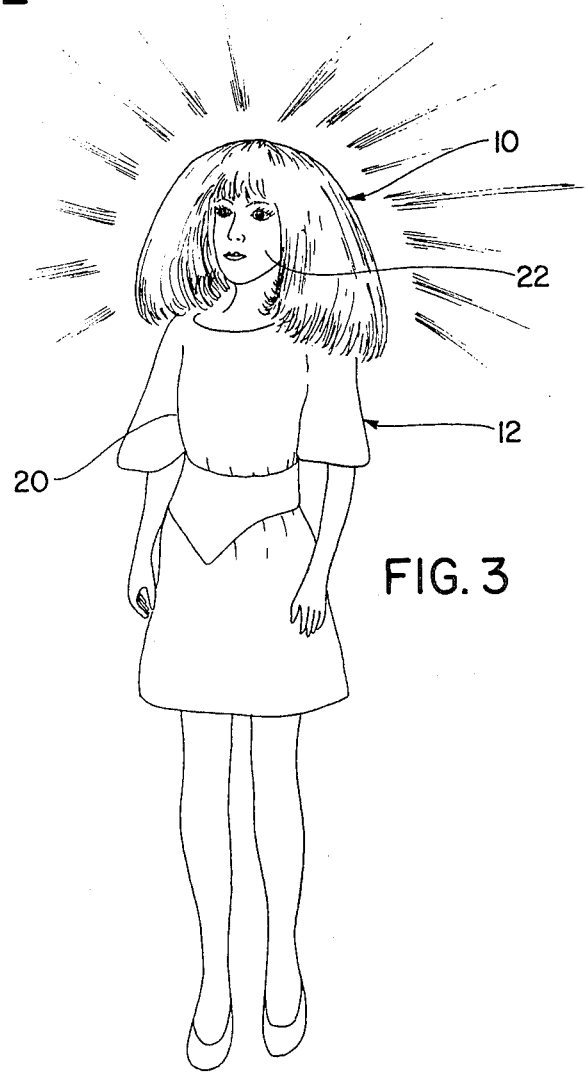
FIG. 3 is an elevational view of a doll having artificial hair comprising fibers made in accordance with the instant invention.

Referring now to the drawing, the artificial fiber of the instant invention is illustrated and generally indicated at 10 in FIGS. 1-3; and the toy doll of the instant invention which includes artificial hair comprising a plurality of the fibers 10 is illustrated and generally indicated at 12 in FIG. 3.

Referring first to FIGS. 1 and 2, the fiber 10 comprises a body portion 14, a plurality of phosphorescent particles 16 in the body portion 14, and a coupling agent 18 on the particles 16.

The body portion 14 comprises a flexible polymeric material which is at least partially translucent and preferably selected from the group of materials consisting of polyamides, polyesters, polyolefins, polyacrylonitriles and polyvinyl chlorides. The body portion 14 may contain suitable known dies or pigments to obtain desired coloration in the fiber 10, and it has a sectional dimension which is less than approximately 0.015 in. and which is preferably in the range of between 0.002 in. and 0.004 in.

The phosphorescent particles 16 preferably comprise a phosphorescent material selected from the group consisting of zinc sulfide, cadmium sulfide and calcium sulfide and they preferably have a maximum particle size which is between approximately 0.0075 in. and 0.005 in. and which is also less than one half of the cross sectional dimension of the body portion 14 and the overall fiber 10. In this regard, it has been found that when the particles 16 have sectional dimensions which are larger than one half of the sectional dimension of the body portion 14, they tend to weaken the fiber 10 to the extent that it is rendered ineffective for use as artificial hair fiber, as well as for many other applications. The phosphorescent particles 16 preferably also have a mean particle size which is greater than approximately 0.00025 in. since it has been found that phosphorescent particles having mean particle sizes beyond this range tend to have relatively poor phosphorescent characteristics and specifically that they tend to rapidly loose their glowing properties as soon as they are removed from a light source. Particles within these size ranges have not been heretofore available, and hence they must generally be custom ordered from manufacturers. The particles 16 preferably comprise between 2% and 30% by weight of the fiber 10 in order to provide effective levels of phosphorescent properties in the fibers 10 without causing them to be excessively weakened.

The coupling agent 18 comprises a conventional coupling agent, such as a silane or titanate coupling agent, which is readily available to those skilled in the art from a coupling agent manufacturer and which is suitable for coating the particles 16 to enable them to be more uniformly mixed and distributed in the body portion 14. The coupling agent 18 is preferably mixed with the particles 16 to coat the outer surfaces thereof before they are added to the polymeric material from which the body portion 14 is formed so that the particles 16 can be effectively dispersed in the polymeric material and so that they remain substantially uniformly dispersed therein during manufacturing of the fiber 10. In this regard, it has been found that concentrations of as little as fifty parts per million of the couping agent 18 in the fibers 10 can often be sufficient to enable the particle 16 to be effectively dispersed in the polymeric material from which the body portion 14 is extruded.

In accordance with the above, the method of manufacturing the fiber 10 is preferably carried out by first mixing phosphorescent particles, such as the particles 16, with a suitable coupling agent 18, such as a silane or a titanate coupling agent. The particles that are utilized in the method preferably have a maximum particle size of between 0.0075 in. and 0.0005 in. and a mean particle size which is greater than approximately 0.00025 in. Further, the particles preferably comprise a material selected from the group consisting of zinc sulfide, cadmium sulfide and calcium sulfide. In the next step of the method, the phosphorescent particles and the coupling agent are mixed with an unhardened, at least partially translucent polymeric material preferably by extruding the mixture to achieve a substantially uniform distribution of the particles 16 therein. The polymeric material preferably comprises a material selected from the group consisting of polyamides, polyesters, polyolefins, polyacrylonitriles and polyvinyl chlorides; and the particles preferably comprise between 2% and 30% by weight of the polymeric material. After the particles and the coupling agent have been mixed with the polymeric material, the resultant mixture is extruded preferably in either a wet or dry spinning process to form fibers having sectional dimensions which are less than approximately 0.015 in. but greater than twice the maximum size of the particles therein.

EXAMPLE

In a specific application of the method of the subject invention, one hundred kilograms of phosphorescent zinc sulfide particles having a mean particle size of 0.0006 in. and a maximum particle size of 0.0013 in. was mixed with 50 ppm of A151 silane coupling agent manufactured by Union Carbide Corp. Specifically, this was done by first preparing an alcohol solution of the coupling agent and then mixing the resultant solution with the zinc sulfide particles. The silane coated particles were then mixed with one hundred kilograms of Grilon (Emser Industries TM) A28 nylon 6 by an extrusion and pelletizing process. The resultant mixture was then further mixed with an additional eight hundred kilograms of Grilon A28 nylon 6 containing 0.006% by weight of Rosso Orasol G (Hoechst AG TM) pigment to produce a final blend which was extruded in a conventional fiber spinning process and stretched by conventional processing procedures to form fibers having sectional dimensions of approximately 0.003 in. The fibers made by this procedure were found to have a pink color and, after excitation, produced an orange-yellow luminescence in the dark. The fibers were found to have a matte finish, to be substantially uniform, to have a substantially smooth surface, texture, and to be relatively strong and durable.

While it has been generally found that the fibers 10 of the subject invention can be utilized for a variety of different applications, such as for manufacturing phosphorescent fabrics and the like, they have been found to be particularly effective for use as artificial hair fibers for toy dolls, such as the doll 12. In this regard, the doll 12 comprises a toy doll of generally conventional construction, including a body 20 having a head portion 22. The doll 12, however, includes a plurality of the fibers 10 which are preferably permanently rooted in the head 22 to provide artificial hair fibers thereon. In this regard, it has been found that by utilizing the fibers 10 for synthetic or artificial hair fibers on the head 22 of the doll 12, the play value of the doll 12 can be substantially enhanced. Specifically, it has been found that by imparting phosphorescent properties to the hair of the doll 12, the doll 12 can be used in novel imaginary themes and concepts wherein an imaginary character embodied in the doll 12 is capable of having nighttime dreams. In this regard, it has been found that by imparting phosphorescent characteristics to the hair of the doll 12, the play value of the doll 12 as an imaginary character and as a nighttime companion for small children is substantially enhanced. It has been further found that the phosphorescent hair of the doll tends to stimulate the imaginations of children playing therewith and that it therefore substantially increases the child appeal of the doll 12.

It is seen therefore that the instant invention provides an effective phosphorescent fiber construction which can be effectively utilized in a variety of applications. It has been found that by maintaining the sizes of the particles 16 within the ranges specified herein, phosphorescent properties can be imparted to the fibers 10 without reducing the tensil strengths thereof to unacceptable levels. It has also been found that fibers such as the fibers 10 can be effectively manufactured in accordance with the method of the instant invention and that they have particular application as artificial hair fibers for toy dolls. Hence, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed:

1. In a doll construction of a type including a doll body having a head and a plurality of flexible stranded artificial hair fibers on said head, the improvement comprising at least a portion of said hair fibers being phosphorescent and being extruded from a material comprising a flexible polymeric material which is at least partially translucent and a plurality of phosphorescent particles in said polymeric material, said translucent hair fibers having cross sectional dimensions of less than approximately 0.015 in., said phosphorescent particles having a maximum particle size which is between 0.0075 in. and 0.0005 in. and which is less than one half of said cross sectional dimension.

2. In the doll construction of claim 1, said phosphorescent particles having a mean particle size of greater than approximately 0.00025 in.

3. In the doll construction of claim 2, said translucent hair fibers having sectional dimensions of between 0.002 in. and 0.004 in.

4. In the doll construction of claim 2, said polymeric material comprising a material selected from the group consisting of polyamides, polyesters, polyolefins, polyacrylonitriles and polyvinyl chlorides.

5. In the doll construction of claim 2, said phosphorescent particles comprising a material selected from the group consisting of zinc sulfide, cadmium sulfide and calcium sulfide.

6. In the doll construction of claim 2, said material from which said fibers are extruded further comprising a coupling agent, said coupling agent being mixed with said phosphorescent particles before said phosphorescent particles are mixed with said polymeric material and being of a type which is suitable for coating said phosphorescent particles, said phosphorescent particles and said coupling agent being mixed together with said polymeric material to achieve a substantially uniform distribution of said phosphorescent particles therein, said coupling agent operating to enhance the uniformity of the distribution of said phosphorescent particles in said polymeric material.

7. In the doll construction of claim 6, said coupling agent further characterized as either a silane or a titanate coupling agent.

8. In the doll construction of claim 2, said translucent hair fibers comprising between approximately 2% and 30% by weight of said phosphorescent material.

* * * * *